Sept. 29, 1959  F. C. LUSTIG  2,906,163
SAFETY DEVICE FOR EXPOSURE IN TURRET TYPE MOTION PICTURE CAMERA
Filed Oct. 15, 1958
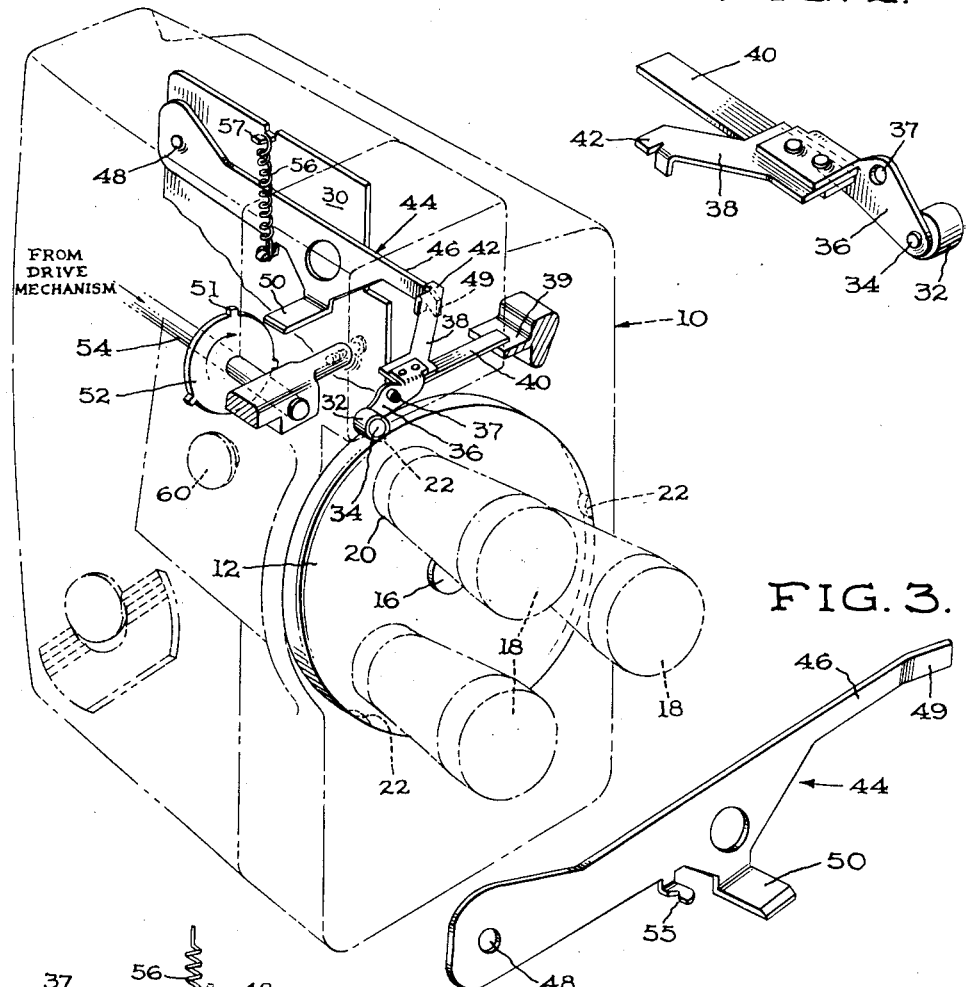
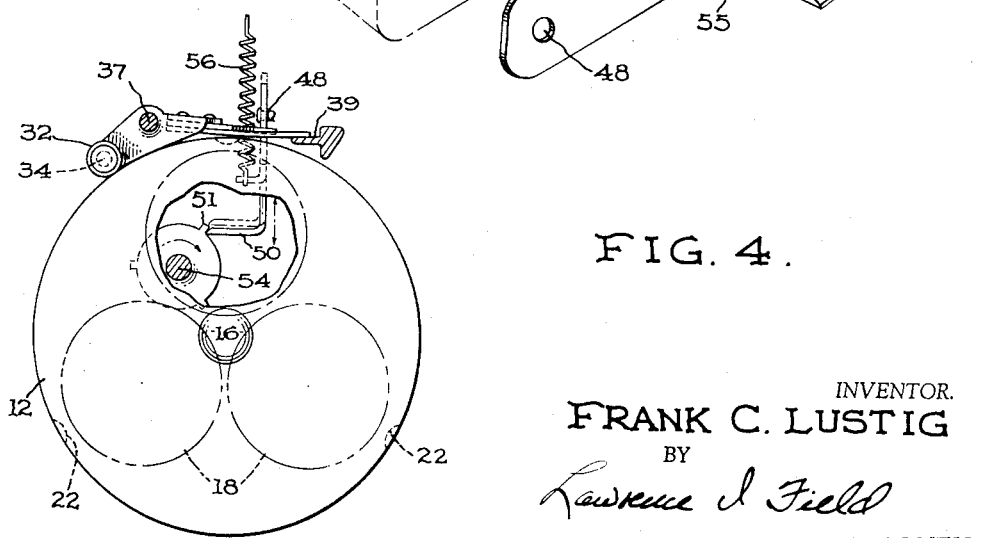
INVENTOR.
FRANK C. LUSTIG
BY
Lawrence I. Field
ATTORNEY United States Patent Office 2,906,163
Patented Sept. 29, 1959

2,906,163

SAFETY DEVICE FOR EXPOSURE IN TURRET TYPE MOTION PICTURE CAMERA

Frank C. Lustig, Highland Park, Ill., assignor to Revere Camera Company, a corporation of Delaware Application October 15, 1958, Serial No. 767,465

1 Claim. (Cl. 88—16)

This invention relates to a device for preventing operation of a turret type motion picture camera mechanism when a lens is not properly aligned with the exposure aperture.

Turret type motion picture cameras conveniently provide the photographer with a choice of lenses all carried on a single mount and usable interchangeably with the remainder of the camera. In one conventional arrangement three lenses—a telescopic lens, a wide angle lens and the usual lens—are carried on a rotatable mount and are manually swung into position by the operator, by rotation of the mount about an axis parallel to the axis of the lens system. In many such devices the only means provided for indicating to the photographer that the lens is aligned properly with the exposure aperture, is the audible clicking into place of the turret when it is rotated. Turret lens mounts are usually constructed so that the rotatable mount will remain stationary and in place even though the lens is not properly aligned with the exposure aperture of the camera unless the operator actually rotates it into place. When the rotatable mount has not been rotated into the proper alignment the photographer exposes the film unaware that the lens is not aligned with the exposure aperture and wastes the film because heretofore the camera has run whether or not the lens is aligned.

By the present invention, means are provided to prevent the running of the camera when no lens is aligned properly with the exposure aperture.

Previous efforts to accomplish the desired purpose are exemplified in known devices, but the known apparatus has been found to suffer from inherent limitations restricting its applicability to present day motion picture cameras.

In motion picture cameras it is now a common practice to connect the operating button to the operating mechanism so that movement of the button in one direction from the off or neutral position actuates the camera in run (continuous run) while movement of the button in the opposite direction from the off or neutral position actuates the camera for single frame action. In one previously known device the plunger which operates the camera has movement in only one direction and is returned to the off position by a spring. Hence the arresting mechanism is not adapted to use with modern cameras in which the operating button may be moved to more than a single position.

In another known device, mechanism blocks motion of the shutter whenever no lens is properly aligned. Since the shutter is comparatively delicate, it may become warped or loosen by being subjected to such action.

One object of the present invention is to provide a more adaptable and rugged mechanism than similar prior art devices of the nature described.

Briefly in accordance with the invention means for indexing the turret lens are provided with a device which automatically locks and effectively stops the camera from running whenever the turret is not aligned properly.

In the drawings:

Figure 1 is a schematic isometric view of a preferred embodiment of the present invention, installed in a turret-type motion picture camera.

Figure 2 is a view of turret indexing roller and spring in the device of Figure 1.

Figure 3 is a view of a latch arm in the device of Figure 1.

Figure 4 is a partial front elevation of the device of Figure 1 with a portion broken away to show the operation of the latch mechanism.

It will be understood that in the figures, structure unnecessary to the understanding of the invention has been omitted for a clearer understanding of the invention.

As best see in Figure 1, a turret type motion picture camera 10 comprises a housing on the forward portion of which there is supported a turret lens mount 12 mounted for rotation about an axis 16 whereby the several lenses 18 are selectively brought into alignment with the exposure aperture 20. Turret lens mount 12 is formed with indentations 22 equally spaced along the periphery of mounting plate 12. With three lenses, as shown the indentations are spaced 120° apart, while with four they would be spaced 90° apart. In use the turret mount is manually rotated by the operator to bring the desired lens into alignment with the exposure aperture, whatever the number of lenses.

Carried on an inner portion of the camera housing is a turret indexing roller and spring assembly shown in greater detail in Figure 2. The assembly comprises an indexing roller 32 adapted to seat in the indentations 22 along the periphery of the lens mount 12. Indexing roller 32 is carried on a pin 34 secured to a bracket 36 from which an actuating lever portion 38 and a spring portion 40 extend. As shown in Figure 1, bracket 36 is pivotally mounted on the frame of the camera to pivot about an axis 37 parallel to the axis of roller 32. The terminal portion of the spring 40 bears on a fixed abutment 39 on the inner surface of the camera housing. Spring 40 constantly urges the bracket 36 about axis 37 so that indexing roller 32 is always urged into engagement with the periphery of the lens mount 12. The actuating lever 38 may be formed integrally with bracket 36, or, as shown, it may be formed separately and securely fastened to the bracket e.g. by riveting. The actuating lever terminates in a tip 42 which engages the latching means 44 shown in Figure 3.

The latching means 44 comprises a pivotally supported arm 46, mounted to pivot freely about a pin 48 by means of which arm 46 is secured to a plate 30 extending longitudinally of the camera. One extremity 49 of the arm 46 is adapted to be engaged by the outwardly extending tip portion 42 of the actuating lever, whenever the indexing roller is resting on the periphery of lens mount 12 and is not in a recess 22 on the peripheral portion of the lens mount 12.

Intermediate of the ends of arm 46 is a latching bar 50 adapted to engage notched protuberances 51 on a disc 52. Disc 52 is connected to the drive mechanism, being shown in the present instance as mounted on the governor shaft 54. Adjacent the latching bar 50 is a small tab 55 to which one end of a spring 56 is secured. Another extension 57 on plate 30 serves as the means for securing the other end of spring 56.

An operating button 60 carried on one side of the camera casing provides the operator with means for placing the camera in operation. When a lens is properly aligned with the exposure aperture, indexing roller 32 is seated in a recess 22, on the periphery of the lens mount 12 and bracket 36 is pivoted so that tip 42 of the actuating lever does not engage the extending portion 49 of the latch arm, and consequently the tip 50 of the latching bar is retracted sufficiently to permit disc 52 to rotate freely. This is further insured by provision of spring means 56 which tends to urge the latch arm into a disengaged position.

When, however, no lens is properly aligned with the exposure aperture indexing roller 32 is not seated in a recess 22, but rides instead on the periphery of the lens mount and as a consequence tip 42 engages the extension 49 on latching means 44 and urges latch arm 50 into engagement with the protuberances 51 of disc 52 and affords a positive means for preventing the film driving mechanism from operating.

It will be seen that the engagement of latch bar 50 with portions 51 of disc 52 affords a positive means for stopping the running of the camera whenever the lens is not aligned with the exposure aperture and hence prevents the wasteful exposure of film.

I claim:

A turret type camera including in combination: a camera housing, means defining an exposure aperture, a rotatable turret plate adapted to support a plurality of lenses for movement into and out of alignment with the exposure aperture, a corresponding number of indentations in the periphery of the turret plate, indexing means pivotally supported on a forward surface of the camera housing and comprising a pivoted arm carrying a roller at one end thereof, adapted to ride on the periphery of the rotatable turret plate and a bifurcated portion at its other end, one portion of which is a leaf spring which bears against an abutment carried on the camera housing and the other portion of which is adapted to engage a latching means; and a latching means supported on a partition plate in said camera housing and comprising an elongated lever, a pin means located adjacent one end of said lever and supporting said lever for rotation about the supporting pin; spring engaging means located intermediate the ends of said lever, a spring secured to the spring engaging means and to the partition plate whereby the lever is continually urged out of engagement with mechanism advancing film through said camera; a finger on said lever, adjacent to a portion of the mechanism advancing the film through the camera, the free extremity of the lever being located for engagement with one arm of the bifurcated extremity of the indexing means, and adapted to cause the finger to be moved selectively into and out of engagement with the film advancing mechanism depending on the relative position of the indexing roller on the periphery of the turret plate.

References Cited in the file of this patent

UNITED STATES PATENTS

| | | |
|---|---|---|
| 1,893,327 | Howell | Jan. 3, 1933 |
| 2,682,192 | Bolsey | June 29, 1954 |
| 2,687,669 | Bolsey | Aug. 31, 1954 |